(12) United States Patent
Viswanath Putcha et al.

(10) Patent No.: US 10,796,274 B2
(45) Date of Patent: Oct. 6, 2020

(54) CONSUMABLE ITEM ORDERING SYSTEM

(71) Applicant: Walmart Apollo, LLC, Bentonville, AR (US)

(72) Inventors: Sai Phaneendra Sri Harsha Viswanath Putcha, Bentonville, AR (US); Donald R. High, Noel, MO (US)

(73) Assignee: Walmart Apollo, LLC, Bentonville, AR (US)

( * ) Notice: Subject to any disclaimer, the term of this patent is extended or adjusted under 35 U.S.C. 154(b) by 189 days.

(21) Appl. No.: 15/410,347

(22) Filed: Jan. 19, 2017

(65) Prior Publication Data

US 2017/0213185 A1 Jul. 27, 2017

Related U.S. Application Data

(60) Provisional application No. 62/280,442, filed on Jan. 19, 2016.

(51) Int. Cl.
*G06Q 10/08* (2012.01)
(52) U.S. Cl.
CPC ................. *G06Q 10/087* (2013.01)
(58) Field of Classification Search
CPC ......... G05B 2219/2613; G06Q 20/204; G06Q 10/08; G06Q 10/00; G06Q 10/87
See application file for complete search history.

(56) References Cited

U.S. PATENT DOCUMENTS 6,204,763 B1 * 3/2001 Sone .................... A47G 29/141
221/2
6,295,423 B1 9/2001 Haines
6,829,520 B1 * 12/2004 Green ....................... G01K 3/04
700/225
7,120,595 B2 10/2006 Alexander
7,130,814 B1 10/2006 Szabo
7,340,414 B2 3/2008 Roh
(Continued)

FOREIGN PATENT DOCUMENTS

CN 202993745 6/2013
CN 203024532 6/2013
(Continued)

OTHER PUBLICATIONS

PCT; App. No. PCT/US2017/013872; International Search Report and Written Opinion dated Mar. 23, 2017.
(Continued)

*Primary Examiner* — Florian M Zeender
*Assistant Examiner* — Vanessa Deligi
(74) *Attorney, Agent, or Firm* — Fitch, Even, Tabin & Flannery LLP

(57) ABSTRACT

A server system tracks purchases by a user of consumable items. Notifications of use of an appliance using a consumable item are received and an estimated amount of the consumable item is decremented in response to the notification. A consumption rate is determined based on the notifications and an expected runout date is calculated. Delivery of the consumable items is then invoked on or before the runout date. The appliance may include, for example, be a network-enabled washing machine that reports loads washed, a refrigerator that detects items removed therefrom, a coffee maker that reports cups of coffee prepared.

20 Claims, 8 Drawing Sheets

(56) References Cited

U.S. PATENT DOCUMENTS

| | | |
|---|---|---|
| 7,424,447 B2 | 9/2008 | Fuzell-Casey |
| 7,448,546 B2 | 11/2008 | Jung |
| 7,475,026 B2 | 1/2009 | Rock |
| 7,650,298 B2 | 1/2010 | Godlewski |
| 7,716,086 B2 | 5/2010 | Anderson |
| 7,774,239 B2 | 8/2010 | Prescott |
| 7,930,221 B2 | 4/2011 | Brown |
| 8,234,178 B1 | 7/2012 | Rempe |
| 8,275,665 B2 | 9/2012 | Bodin |
| 8,345,282 B2 | 1/2013 | Nishimi |
| 8,374,925 B2 | 2/2013 | Liamos |
| 8,446,462 B2 | 5/2013 | Shahraray |
| 8,583,512 B1 | 11/2013 | Gupta |
| 8,606,645 B1 | 12/2013 | Applefeld |
| 8,756,122 B2 | 6/2014 | Lowenstein |
| 8,924,262 B2 | 12/2014 | Shuster |
| 8,963,956 B2 | 2/2015 | Latta |
| 9,134,675 B2 | 9/2015 | Yang |
| 9,135,849 B2 | 9/2015 | Herger |
| 9,255,813 B2 | 2/2016 | Liu |
| 9,262,781 B2 | 2/2016 | Mackinnon Keith |
| 9,672,791 B2 | 6/2017 | Kapinos |
| 9,691,114 B2 | 6/2017 | Ashrafzadeh |
| 10,075,435 B1 | 9/2018 | Byrd |
| 10,360,617 B2 | 7/2019 | High |
| 2001/0034636 A1 | 10/2001 | Ikemura |
| 2001/0045449 A1 | 11/2001 | Shannon |
| 2002/0116301 A1 | 8/2002 | Chapman |
| 2005/0149414 A1 | 7/2005 | Schrodt |
| 2006/0146012 A1 | 7/2006 | Arneson |
| 2006/0229950 A1 | 10/2006 | Pabbisetty |
| 2008/0183599 A1 | 7/2008 | Hill |
| 2009/0182499 A1 | 7/2009 | Bravo |
| 2009/0319178 A1 | 12/2009 | Khosravy |
| 2010/0102930 A1 | 4/2010 | McCoy |
| 2010/0249990 A1 | 9/2010 | Tsao |
| 2011/0157471 A1 | 6/2011 | Seshadri |
| 2011/0213664 A1 | 9/2011 | Osterhout |
| 2011/0254932 A1 | 10/2011 | Doung |
| 2012/0047023 A1 | 2/2012 | Kruglick |
| 2012/0099255 A1* | 4/2012 | Lee ................ F25D 25/025 361/679.01 |
| 2012/0136741 A1 | 5/2012 | Agarwal |
| 2012/0212499 A1 | 8/2012 | Haddick |
| 2012/0278190 A1 | 11/2012 | Brown |
| 2013/0036048 A1 | 2/2013 | Campos |
| 2013/0226727 A1 | 8/2013 | Serra |
| 2013/0268317 A1 | 10/2013 | Mattila |
| 2013/0275300 A1 | 10/2013 | Killian |
| 2013/0346168 A1 | 12/2013 | Zhou |
| 2014/0002357 A1 | 1/2014 | Pombo |
| 2014/0129328 A1 | 5/2014 | Mathew |
| 2014/0154382 A1 | 6/2014 | Green |
| 2014/0172640 A1 | 6/2014 | Argue |
| 2014/0195383 A1 | 7/2014 | Kim |
| 2014/0214547 A1 | 7/2014 | Signorelli |
| 2014/0229343 A1* | 8/2014 | Higgins ............ G06Q 10/087 705/28 |
| 2014/0244289 A1 | 8/2014 | Lowenstein |
| 2014/0244768 A1* | 8/2014 | Shuman ............ H04W 4/70 709/206 |
| 2014/0252091 A1 | 9/2014 | Morse |
| 2014/0279291 A1 | 9/2014 | Brosnan |
| 2014/0336723 A1 | 11/2014 | Ben-Ezra |
| 2015/0019342 A1 | 1/2015 | Gupta |
| 2015/0105880 A1* | 4/2015 | Slupik ............ H04L 12/2825 700/90 |
| 2015/0149298 A1 | 5/2015 | Tapley |
| 2015/0156266 A1* | 6/2015 | Gupta ............ H04L 67/12 709/224 |
| 2015/0227882 A1 | 8/2015 | Bhatt |
| 2015/0234372 A1 | 8/2015 | Slupik |
| 2015/0302510 A1* | 10/2015 | Godsey ............ G06Q 30/0635 705/26.81 |
| 2015/0312348 A1 | 10/2015 | Lustgarten |
| 2015/0323245 A1 | 11/2015 | Tan |
| 2015/0366411 A1* | 12/2015 | Yang ............ A47K 5/1217 222/25 |
| 2016/0026009 A1 | 1/2016 | Urbajs |
| 2016/0071149 A1 | 3/2016 | Farshori |
| 2016/0140526 A1* | 5/2016 | Cummins ............ G06Q 20/12 705/28 |
| 2016/0146614 A1 | 5/2016 | Gupta |
| 2016/0162715 A1 | 6/2016 | Luk |
| 2016/0314514 A1 | 10/2016 | High |
| 2017/0039617 A1 | 2/2017 | Wind, III |
| 2018/0060949 A1 | 3/2018 | Mattingly |
| 2019/0087769 A9* | 3/2019 | Glasgow ............ G06Q 10/087 |
| 2019/0295150 A1 | 9/2019 | High |

FOREIGN PATENT DOCUMENTS

| | | | |
|---|---|---|---|
| CN | 103604271 | | 2/2014 |
| CN | 103776231 | | 5/2014 |
| EP | 1468473 | | 10/2004 |
| EP | 2874068 | | 5/2015 |
| WO | 2013074232 | | 5/2013 |
| WO | 2013189183 | | 12/2013 |
| WO | 2014010784 | | 1/2014 |
| WO | 2014016212 | | 1/2014 |
| WO | 2014070814 | | 5/2014 |
| WO | WO-2014099858 A2 * | 6/2014 | ......... G06Q 10/0838 |
| WO | 2014123528 | | 8/2014 |

OTHER PUBLICATIONS

Turbonet; "Mobile Application in Retail"; http://turbonet.co.in/index.php?route=information/information&information_id=21; Retrieved on Oct. 28, 2015; 7 Pages.

Screenshots from My Airtel App; Retrieved on Dec. 13, 2016; 7 pages.

PCT; App. No. PCT/US2017/048598; International Search Report and Written Opinion dated Nov. 6, 2017.

UKIPO; App. No. GB1613079.1; Office Action dated Nov. 7, 2018.

U.S. Appl. No. 15/690,649; Office Action dated Aug. 22, 2018.

Acquity Group, LLC; "The Internet of Things: The Future of Consumer Adoption"; Published in 2014; 11 Pages.

WiseGEEK; "What is a Smart Refrigerator"; http://www.wisegeek.com/whatisasmartrefrigerator.htm; Jan. 17, 2015; 4 Pages.

Fildes, Jonathan; "Chips with everything: your groceries are wired to the Web. Your clothes are talking to each other. Tiny smart tags are about to find their way onto everything you buy, and the results will change your life"; New Scientist 176.2365 44(4); Oct. 19, 2002; pp. 1-4.

Hou, R. et al.; "A Food Management System Based on IOT for Smart Refrigerator"; Applied Mechanics and Materials, vols. 427-429; 2013; pp. 2936-2939.

U.S. Appl. No. 16/435,891, filed Jun. 10, 2019, Donald R. High.

* cited by examiner

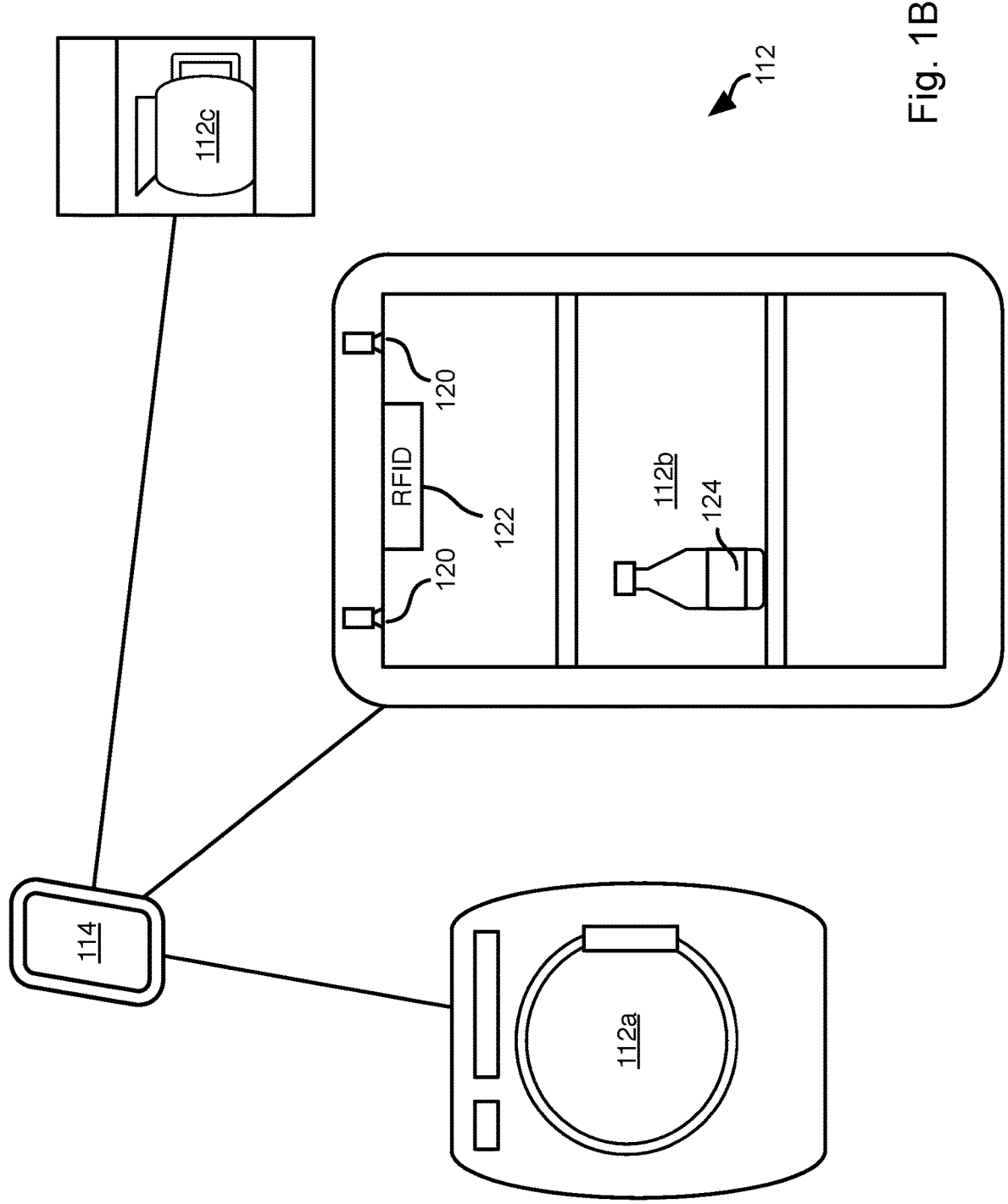

CONSUMABLE ITEM ORDERING SYSTEM

CROSS-REFERENCE TO RELATED APPLICATION

This application claims the benefit of U.S. Provisional Application No. 62/280,442, filed Jan. 19, 2016, which is incorporated herein by reference in its entirety.

BACKGROUND

Field of the Invention

This invention relates to systems and methods for ordering of consumable goods.

Background of the Invention

Shopping for necessary items is often a weekly task. However, the items that are purchased are often repetitive. Some retailers offer a subscription service for frequently used items. For example, certain retailers allow users to make a purchase of a product recurring. However, this relies upon the consumer having precise knowledge of the consumption rate for the product. If the user overestimates, then unused product will pile up. If the user underestimates, then there will not be enough.

The systems and methods disclosed herein provide an improved approach for performing automated purchasing of consumable products.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIGS. 1A and 1B are schematic block diagrams of network environments for implementing automated ordering of consumable products in accordance with an embodiment of the present invention;

DETAILED DESCRIPTION

Figure 1A:
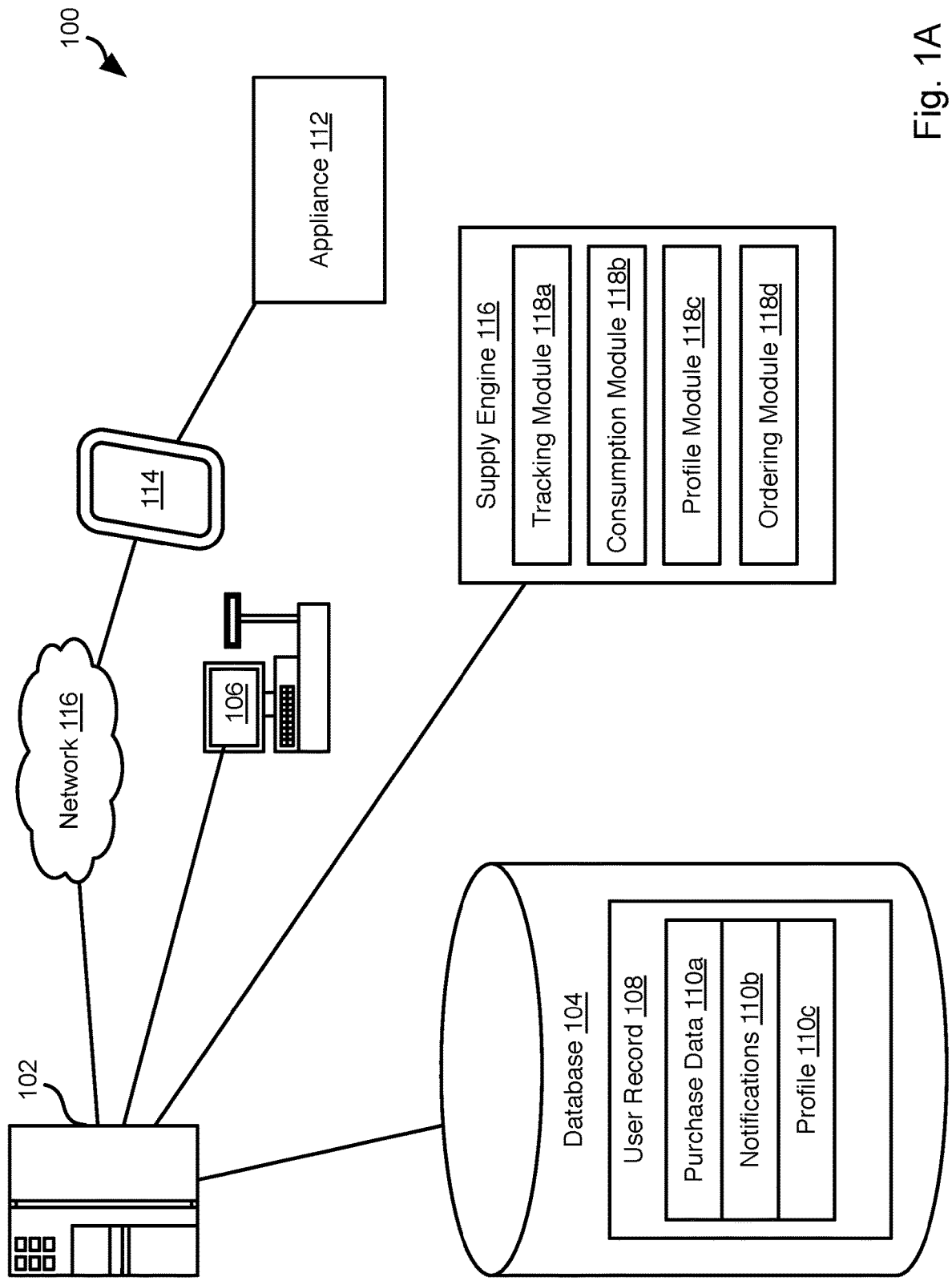

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1A, a network environment 100 may include a server system 102. For example, the server system 102 may be operated or used by a retailer that sells products to a consumer and has the capacity to determine a customer associated with a transaction, such as by determining that the credit card number of a transaction corresponds to a particular customer or that a customer account was used to conduct the transaction.

The server system 102 may host or access a database 104. Transactions as reported by a POS 106 may be stored in the database 104 in association with a particular user record 108. For example, for each user of a plurality of users, a user record 108 may be maintained. For each transaction including a credit card, account number, username, or other data uniquely identifying the user corresponding to a user record 108, the purchase data 110a may be updated to include information from the transaction. The information from the transaction may include identifiers and quantities of the items purchased in the transaction and the date of the transaction. One or more databases 104, rules engines and/or other such systems can be included that are configured to maintain sets of rules to be applied in determining quantity of item used per use or instance, determining consumption, determining consumption rate, determining runout dates, invoking ordering, and/or other such processing.

As described in greater detail below, appliances 112 may notify the server system 102 of events indicating consumption of consumable products. For example, by way of a user computing device 114, such as a smart phone 114, tablet computer 114, or other computing device 114 coupled to the appliance 112 by means of a wireless or wired local network. The user computing device 114 may communicate with the server system 102 by means of a network 116 such as the Internet, a local area network (LAN), wide area network (WAN), or other wired or wireless network. The notifications received by the user computing device 114 of a user may be forwarded to the server system 102, which stores a record of them in a notifications field 110b of the user record 108 for that user.

The server system may execute a supply engine 116. The supply engine 116 may maintain the user record 108 of a user and invoke automated ordering according to the methods described herein. For example, the supply engine 116 may include a tracking module or system 118a that is programmed to receive transaction records of a user, access tracking rules maintained by one or more databases, rule engines and/or the like, and update the purchase data 110a to record the information from the transaction. The tracking module 118a may receive transaction data from various sources such as in-store and online purchases and purchases from other retailers that are either reported by the other retailers or by the user, such as in messages from the user computing device 114.

The supply engine 116 may include a consumption module or system 118b that is programmed to access consumption rules maintained by one or more databases, rules engines and/or the like, and estimate an amount of a product consumed based on notifications received. Examples of methods for determining an amount of a product consumed based on the consumption rules are described below with respect to FIGS. 4 through 6.

The supply engine 116 may include a profile module 118c that accesses profile rules maintained by one or more databases, rules engines and/or the like, and analyzes estimates of consumption of a product as determined by the consumption module 118b and determines based on the profile rules at least one of a consumption rate of the product and an expected runout date based on the consumption rate and the amount purchased as indicated by the purchase data 110a for the product. This data may be stored in a profile 110c of the user. This functionality of the profile module 118c is also described below with respect to FIGS. 4 through 6.

An ordering module or system 118d accesses ordering rules maintained by one or more databases, rules engines and/or the like, and invokes ordering of the product such that delivery thereof occurs on or before the runout date. The ordering, in accordance with the rules, may be completely autonomous or may be contingent on receiving authorization for the ordering from the user computing device 114. The ordering module 118d may, in accordance with the ordering rules, schedule deliveries to occur in the future such that when a pre-determined date arrives, delivery of the product is invoked.

Referring to FIG. 1B, the appliances 112 may include network-enabled appliances that are able to communicate with the user computing device 114 by means of WiFi or other wired or wireless protocol. For example, a washing machine 112a may be programmed to transmit a notification to the user computing device 114 each time a load is washed. The washing machine 112a may further report the size of the load, such as by reporting a size input by a user operating the washing machine or as determined from weighing the dry clothes in the washing machine.

The appliances 112 may include a refrigerator 112b including one or more sensors such as cameras 120 or an RFID (radio frequency identifier) detector 122. The cameras 120 may read characters on labels 124 of products in the refrigerator 112b or may detect non-visible markings printed on the label 124 that identify the product. Likewise, the RFID detector 122 may detect RFID tags affixed to products placed in the refrigerator 112b. The refrigerator 112b may be programmed to notify the user computer 114 each time a product is removed from the refrigerator 112b as detected by the cameras 120 or RFID detector 122. The refrigerator 112b may be programmed to notify the user computer 114 each time a product is placed in the refrigerator 112b. In some embodiments, the refrigerator may record the time, product, and direction (insertion or removal) for each removal or insertion of a product and report this recorded data periodically to the user computer device 114 rather than reporting insertions and removals as they occur.

The appliances 112 may include a coffee machine 112c. The coffee machine 112c may be a single serving coffee machine such as is manufactured by KEURIG or another brand. The coffee machine 112c may notify the user computer 114 of each time it uses the item, and as determined based on the set of rules may provide a notification each time that it prepares cup of coffee. Where the coffee maker 112c prepares pots of coffee, it may notify the user computer 114 of each time it prepares a pot of coffee. The coffee maker 112c may further report the size of the pot of coffee in embodiments where the user inputs to the coffee maker 112c an instruction as to the size of pot to make.

The above-described appliances are examples of appliances that may be used according to the embodiments disclosed herein. However, other appliances that consume or are used with consumable products may likewise report their utilization to the user computer device 114 to enable estimation of the consumption of consumable products.

Figure 2:
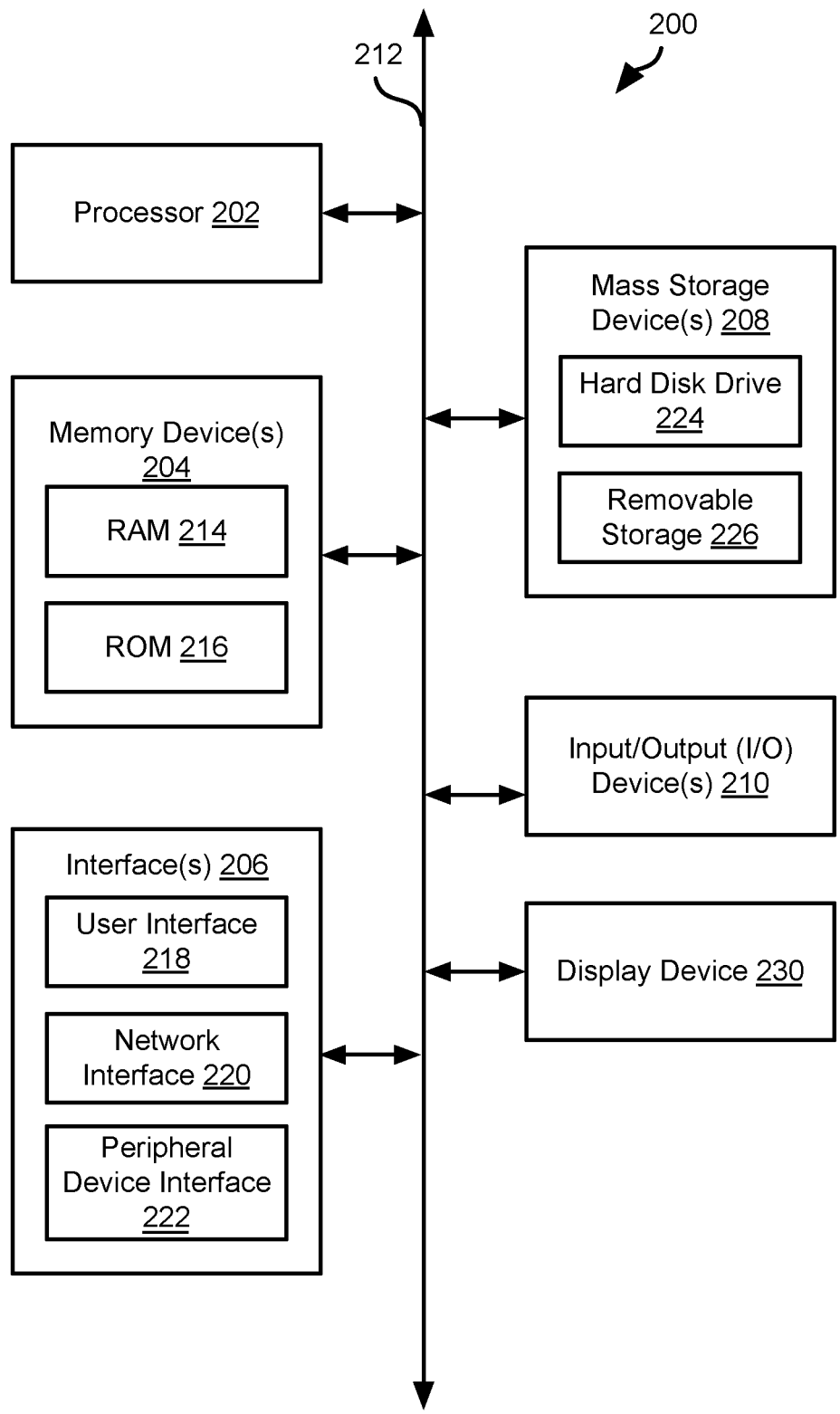
FIG. 2 is a schematic block diagram of an example computing device suitable for implementing methods in accordance with embodiments of the invention.

FIG. 2 is a block diagram illustrating an example computing device 200. Computing device 200 may be used to perform various procedures, such as those discussed herein. The server system 102, user computer device 114, and appliances 112a-112c may have some or all of the attributes of the computing device 200. Computing device 200 can function as a server, a client, or any other computing entity. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, a tablet computer and the like. A server system 102 may include one or more computing devices 200 each including one or more processors.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, I/O device(s) 210, and display device 230 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
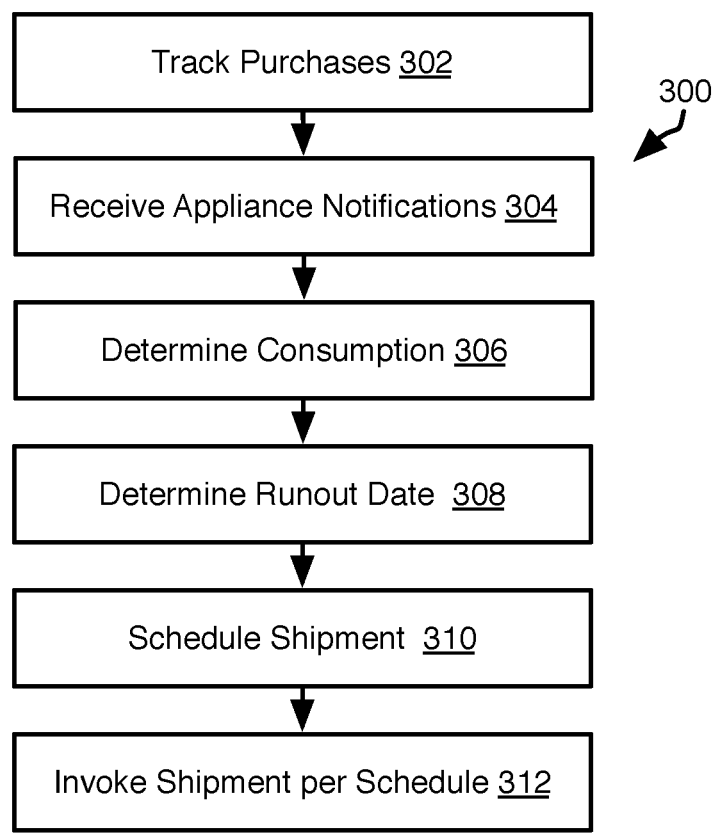
FIG. 3 is a process flow diagram of a method for performing automated purchasing of consumables in accordance with an embodiment of the present invention.

Referring to FIG. 3, the illustrated method 300 may be executed by the server system 102 or by a combination of the server system 102 and a user computing device 114. The method 300 may include tracking 302 purchases. As described above, tracking 302 purchases may include receiving transactions, mapping them to a particular user according to identifying information (username, loyalty account, credit card number) in the transaction, and recording information from the transaction in the purchase data 110a of the user record 108 for that particular user. Tracking 302 purchases may include recording automated purchases invoked according to the method 300. Some embodiments update for each purchase the supply of the corresponding purchased item available for use at the user's residence by a home appliance.

The method 300 may further include receiving 304 appliance notifications. As described above, receiving 304 appliance notifications may include receiving a notification of utilization of the appliance, such as washing of a load of laundry by a washing machine 112a or preparing a cup of coffee by the coffee maker 112c. For a refrigerator 112b, a notification may include a notification that a product has been removed from and/or inserted into the refrigerator 112b. Typically, each of the notifications comprising a notification of use of one of the retail item.

The method 300 may further include determining 306 consumption of products corresponding to the notifications. The determination can include accessing and/or obtaining the set of consumption rules that when applied determine item consumption by the appliance as a function of usage per instance. In particular, each notification may indicate a utilization of an appliance. An amount of product corresponding to the utilization by the appliance may therefore be retrieved from a pre-defined database and inferred to be the amount of the product consumed. Some embodiments apply at least some of the set of consumption rules in determining a quantity per use by the appliance based on tracking over time a number of uses between at least one cycle of a purchase of the item and a subsequent purchase of the same item.

The method 300 may further include determining 308 a runout date. Some embodiments access and/or obtain the set of profile rules and/or other rules that when applied determine item consumption by the appliance as a function of usage per instance. For example, the tracking of purchases may indicate purchase of X amount of a product for use with an appliance. For each notification from that appliance, an amount of the product may be decremented X=X−Y, where Y is the amount inferred to be consumed for each notification from the appliance.

A consumption rate may be determined for each notification. For example, where Z notifications are received in a time period T, the consumption rate (C) for the product may be inferred to be C=Y*Z/T. The runout date may then be inferred to be R=X/C from the time of calculation of R. In some embodiments, the profile system in applying at least the profile set of rules is configured to determine a consumption rate as a function of a number of notifications of usage of the item received over a tracked period of time, and a quantity per use of the item per notification. Further, the profile system in applying at least the profile set of rules is configured to determine the runout date as a function of the tracked supply X of the item purchased by the customer relative to the consumption rate Cf.

The method 300 may further include automating an ordering and/or scheduling 310 shipping of more of the product to be delivered on or before the runout date. Some embodiments access and/or obtain the set of ordering rules that when applied invoke automatic ordering of the at least one item as a function of the runout date. The ordering rules can be applied to invoke the automatic ordering of the item effective to enable delivery of the item at least by the runout date. Shipment of the product may then be invoked 312 to occur on the shipping date. Automatic purchases at step 312 may be added to the purchase data 110a of the user to enable tracking of available supplies and determining a new runout date. The shipment at step 312 may be performed automatically or in response to receiving confirmation that shipment is authorized from the user, such as from the user computer device 114.

Invoking shipment may include invoking shipment according to a preference provided by the user, e.g. to the user's home or office, to a store near the user's home, or some other criteria. The shipment location may be determined based on tracking of a smart phone 114 that indicates where a user is likely to be when a shipment is due, e.g. likely to be home, at work, shopping at a retailer location. The shipment may then be sent to the most likely location and the user notified of the selected location.

Figure 4:
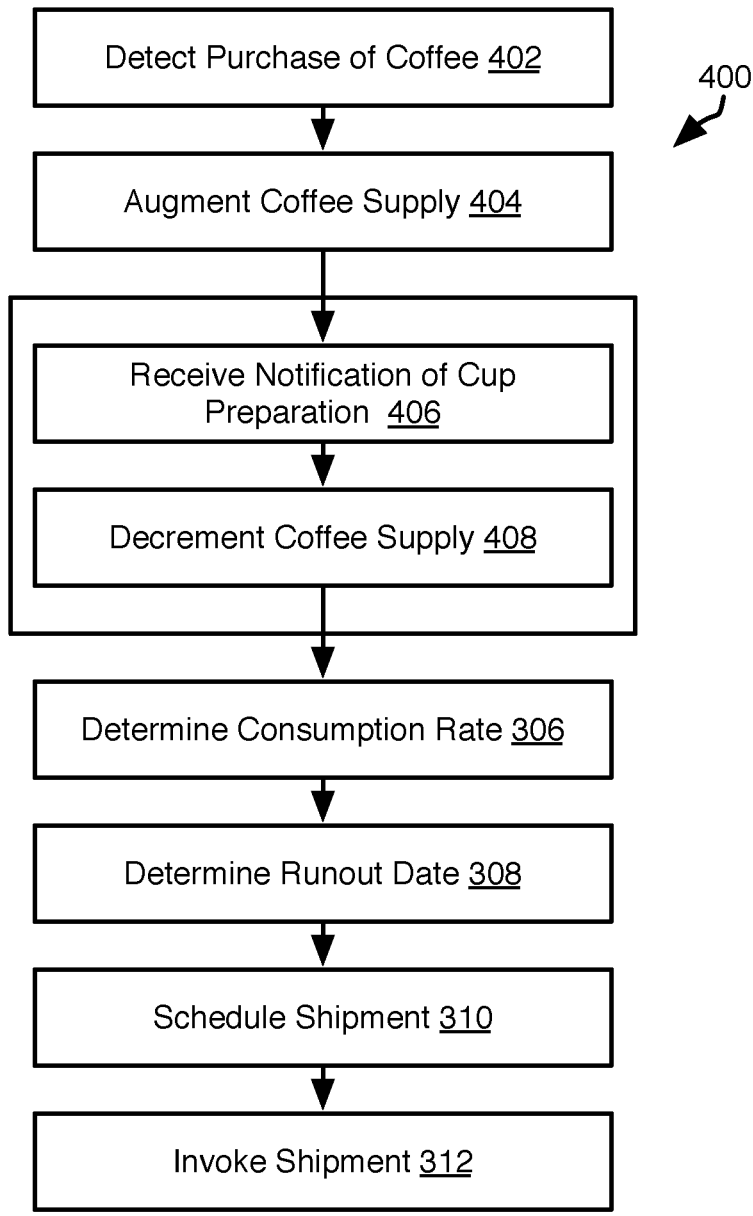
FIG. 4 is a process flow diagram of a method for performing automated purchasing of coffee using an internet-connected coffee maker in accordance with an embodiment of the present invention.

FIG. 4 illustrates an example implementation of the method 300 applied to a coffee maker 112c. The method 400 may include detecting 402 purchase of coffee in a transaction, such as a transaction received and stored as described above. A record of a supply of coffee (X) of the user may be augmented 404 by the amount of coffee purchased. For example, if a previously-purchased amount is not estimated to have been consumed, the newly-purchased amount may be added to an estimated remaining amount of the previously-purchased coffee.

The method 400 may then include receiving 406 notifications of preparations of cups of coffee from the coffee maker 112c and, for each preparation of a cup of coffee that is reported, decrementing 408 the coffee supply (X=X−Y, where Y is the amount of coffee required to prepare a cup). The consumption rules can be applied to determine consumption of the coffee supply, in some implementations from the notifications by incrementing an amount of coffee consumed in response to each notification. In some applications, the amount of coffee used corresponding to a configuration of the coffee maker. Steps 406-408 may be performed repeatedly prior to performing the subsequent steps of the method 400. For example, N times, where N is a predetermined integer, e.g. 10, 20, etc. Alternatively steps 406-408 may be performed until the coffee supply X falls below a predetermined threshold, e.g. sufficient for M cups of coffee, where M is a predetermined number. Steps 406-408 may be performed without continuing to the subsequent steps of the method 400 until Q days have past, where Q is a predetermined number.

In whichever case, steps 306-312 may be performed subsequent to some number of iterations of steps 406-408. Steps 306-312 may be performed in the same manner described above with respect to FIG. 3. Where the product being analyzed is coffee and the amount X refers to the amount of coffee remaining after being decremented at one or more iterations of step 408.

Figure 5:
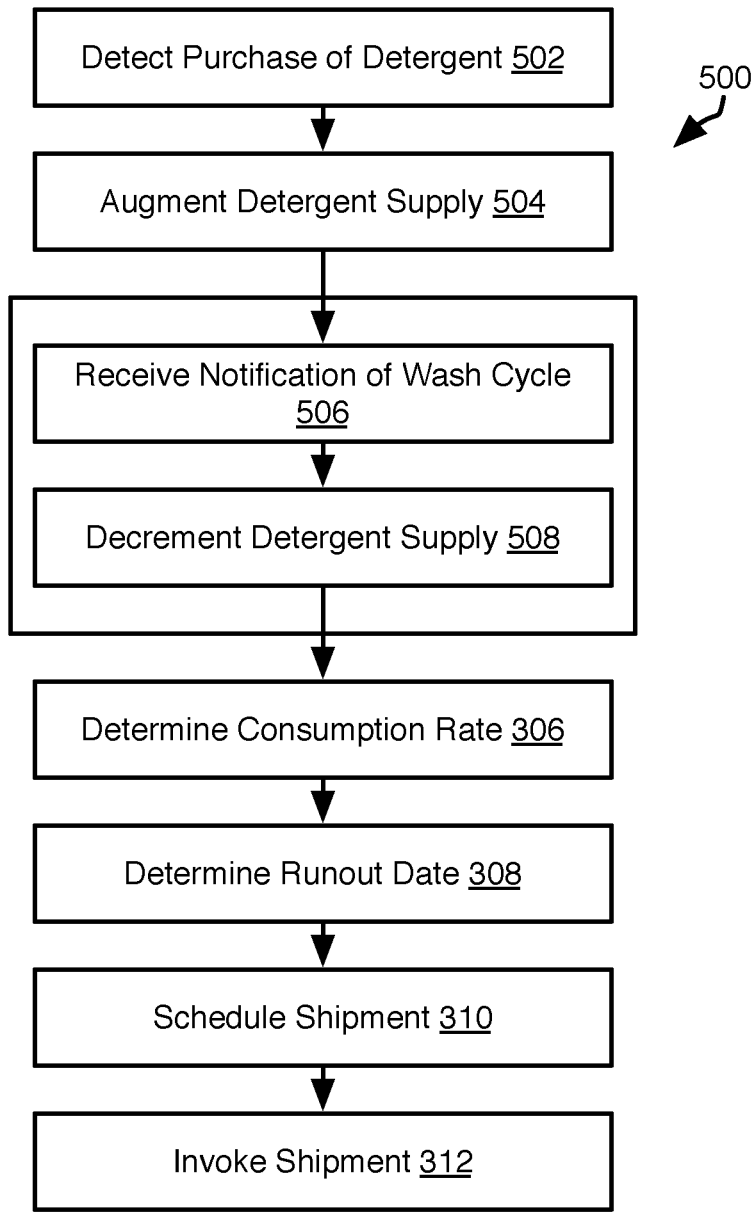
FIG. 5 is a process flow diagram of a method for performing automated purchasing of detergent using an internet-connected washing machine in accordance to an embodiment of the present invention.

FIG. 5 illustrates an example implementation of the method 300 applied to washing machine 112a. The method 500 may include detecting 502 purchase of laundry detergent in a transaction, such as a transaction received and stored as described above. A record of a supply of detergent (X) of the user may be augmented 504 by the amount of detergent purchased. For example, if a previously-purchased amount is not estimated to have been consumed, the newly-purchased amount may be added to an estimated remaining amount of the previously-purchased detergent.

The method 500 may then include receiving 506 notifications of washing a load of clothes by the washing machine 112a and, for each load, decrementing 508 the detergent supply (X=X−Y, where Y is the amount of detergent per load). Steps 506-508 may be performed repeatedly prior to performing the subsequent steps of the method 500. For example, N times, where N is a predetermined integer, e.g. 10, 20, etc. Alternatively steps 506-508 may be performed until the detergent supply X falls below a predetermined threshold, e.g. sufficient for M loads, where M is a predetermined number. Steps 506-508 may be performed without continuing to the subsequent steps of the method 500 until Q days have past, where Q is a predetermined number.

In whichever case, steps 306-312 may be performed subsequent to some number of iterations of steps 506-508. Steps 306-312 may be performed in the same manner described above with respect to FIG. 3. Where the product being analyzed is detergent and the amount X refers to the amount of detergent remaining after being decremented at one or more iterations of step 508.

Figure 6:
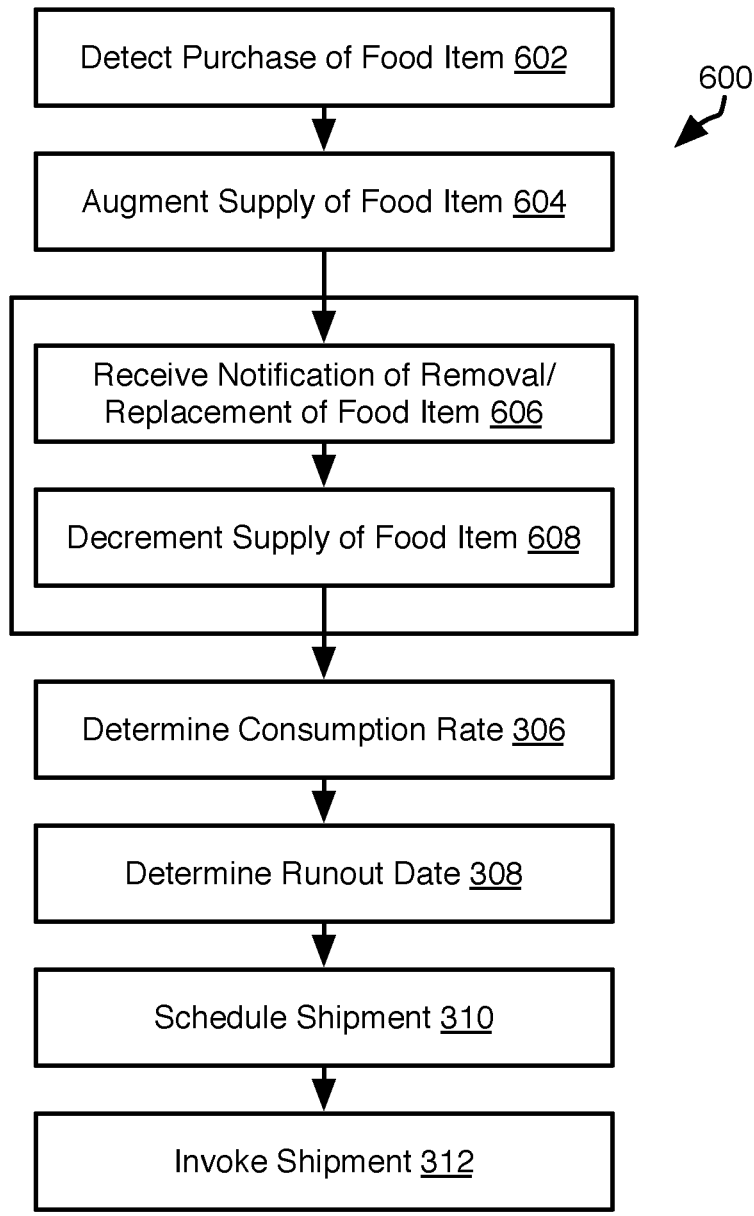
FIG. 6 is a process flow diagram of a method for performing automated purchasing of food using an internet-connected refrigerator in accordance with an embodiment of the present invention.

FIG. 6 illustrates an example implementation of the method 300 applied to a refrigerator 112b. The method 600 may include detecting 602 purchase of perishable food (e.g. food requiring refrigeration or freezing) in a transaction, such as a transaction received and stored as described above. For each perishable food, a record of a supply of the food (X) of the user may be augmented 604 by the amount of the perishable food purchased. For example, if a previously-purchased amount is not estimated to have been consumed, the newly-purchased amount may be added to an estimated remaining amount of the previously-purchased amount of the perishable food. In some embodiments, purchase of food items may be detected 602 due to placement of the food item in the refrigerator 112b and detection thereof by cameras 120 or RFID scanner 122 in addition to tracking user purchases based on transaction information.

The method 600 may then include receiving 606 notifications of removal of the perishable food from the refrigerator 112b. For each removal, the amount of the perishable food remaining may be decremented 608 (X=X−Y, where Y is a serving of the perishable food). The amount Y may be determined based on a recommended serving size or based on observations of consumer behavior. For example, following purchase of the perishable food item, a number of removals may be counted up to the point that the perishable food item is purchased again. The serving size Y may then be set equal to A/R, where A is the amount in a unit of the perishable food item and R is the number of removals. Accordingly, in some implementations, the consumption system in applying at least the consumption set of rules is configured to determine a quantity per use by the appliance based on tracking over time a number of uses between at least one cycle of a purchase of the item and a subsequent purchase of the same item. The quantity per use may further be averaged over multiple cycles, determined based on one or more standard deviations from a median, or other such statistical evaluation of numbers of uses per cycle. Further, the system may continue to track the usage and adjust the quantity per use.

Steps 606-608 may be performed repeatedly prior to performing the subsequent steps of the method 600. For example, N times, where N is a predetermined integer, e.g. 10, 20, etc. Alternatively steps 606-608 may be performed until the supply X of the item from the refrigerator falls below a predetermined threshold, e.g. sufficient for M remaining servings, where M is a predetermined number. Steps 606-608 may be performed without continuing to the subsequent steps of the method 600 until Q days have past, where Q is a predetermined number.

In whichever case, steps 306-312 may be performed subsequent to some number of iterations of steps 606-608. Steps 306-312 may be performed in the same manner described above with respect to FIG. 3, where the product being analyzed is the perishable food and the amount X refers to the amount of the perishable food item remaining after being decremented at one or more iterations of step 608.

The above-described appliances 112a-112c are only examples of appliances that may be used according to the methods described herein. Other appliances that consume a product may also generate notifications that are then used to decrement a remaining amount of the product. For example, a dryer may report loads of laundry and the reports may invoke decrementing of a supply of dryer sheets. A water softener may report gallons of waters treated, which is then used to decrement a supply of salt or other water-softening agent. A cabinet with sensors similar to the refrigerator 112b may report removal of non-perishable foods or other items and these reports may then be used to decrement a supply of the non-perishable foods or other items.

In addition to automated detection of purchases and automated replenishment of items as described above, a user may manually subscribe to purchase products at a particular interval or subscribe to have products tracked according to the methods described herein. For example, a user may scan a product using a smart phone or provide a voice input that is interpreted to correspond to a particular product. In addition, a consumption rate may be determined based exclusively on a time interval between purchases and the amount purchased and the runout date determined based on this consumption rate. Product may then be automatically delivered so as to arrive on or before the runout date in the manner described above.

Figure 7:
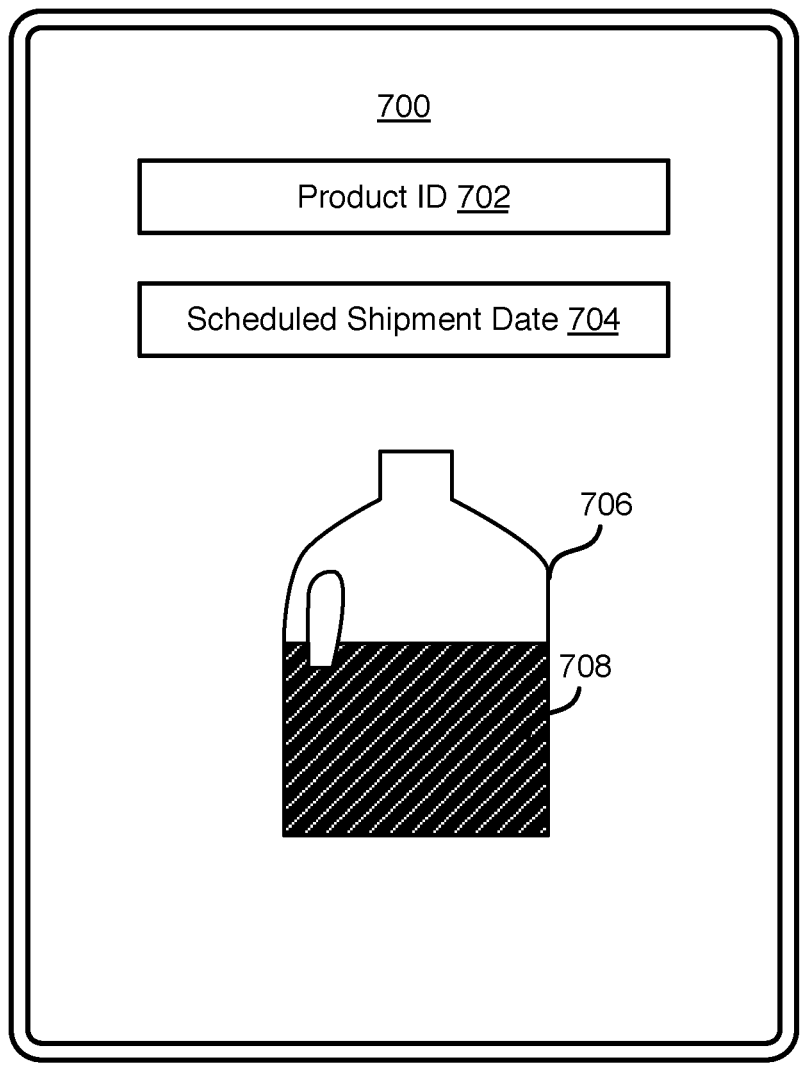
FIG. 7 is an example interface to data obtained in accordance with an embodiment of the present invention.

Referring to FIG. 7, the consumption rate and remaining amount of a product as determined according to the methods described above may be used to present the illustrated interface 700. For example, in response to receiving a selection of a product in a list of products tracked according to the methods described herein, the interface 700 may be displayed for that product. The interface 700 may include a product identifier 702 identifying the product, a scheduled shipment date 704 for the product, and an indicator 706 of the amount remaining of the product. For example, the indicator 706 may be shaped like a container of the product with a filled portion 708 indicating an amount remaining.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A retail customer consumption tracking and automated ordering system comprising:

an item tracking system comprising a tracking processor configured to track purchases of at least one item purchased for a user, and for each purchase updating a supply of a corresponding one of the at least one item available for use at the user's residence by a home appliance;

a consumption system communicatively coupled with the item tracking system and configured to receive notifications from a networking-enabled device operating at the user's residence, the networking-enabled device being the appliance used in combination with the at least one item and each of the notifications comprising a notification of use of one of the at least one item;

receive, from a user computing device associated with the user, (I) a unique item identifier for each of the at least one item captured by the user using the user computing device in scanning the at least one item to capture the unique item identifier, and (II) a corresponding subscription notification of a request from the user to subscribe to start a process of having consumption of the at least one item tracked over time and authorize automatically making subsequent purchases of the at least one item on behalf of the customer; and initiate, in response to receiving the unique item identifier and the subscription notification of the request to start tracking the consumption of the at least one item, an automatic tracking over time of the consumption of the at least one item based on the unique item identifier;

a profile system communicatively coupled with the tracking system and the consumption system, and configured to:

obtain a first set of rules that when applied determine item consumption by the appliance as a function of usage per instance;

apply the first set of rules to determine consumption of the at least one item based on the notifications; and obtain a second set of rules that when applied determine a runout date for the at least one item as a function of the consumption of the at least one item; and apply the second set of rule to determine a runout date for the at least one item according to the consumption of the at least one item; and causes a listing of a plurality of items, comprising the at least one item, being tracked to be displayed to the user, receive a selection from the listing of a first item, and in response to the selection from the user regarding the first item, distributes a graphical user interface to be displayed on the user computing device pictorially illustrating a consumed and remaining amounts of the first item and a first item identifier of the first item and a scheduled shipment date;

wherein the consumption system in applying the first set of rules is configured to determine a quantity per use by the appliance based on tracking over time a number of uses between at least one cycle of a purchase of the at least one item and a subsequent purchase of the same item, wherein the number of uses is based on the received notifications from the network-enabled device;

an ordering system communicatively coupled with the profile system and configured to: obtain a third set of rules that when applied invoke automatic ordering of the at least one item as a function of the runout date; and apply the third set of rules to invoke automatic ordering of the at least one item causing delivery of the at least one item at least by the runout date.

2. The system of claim 1, wherein the networking-enabled device is a networking-enabled coffee making device and the at least one item is a package of coffee;

wherein each notification of the notifications, as determined based on the first set of rules, indicates at least one of that the coffee making device has produced a cup of coffee and has been instructed to make a cup of coffee; and wherein the profile system is further configured to cause the one or more processing devices, in applying at least the first set of rules, to determine consumption of the at least one item from the notifications by incrementing an amount of coffee consumed in response to each notification, the amount corresponding to a configuration of the coffee making device.

3. The system of claim 1, wherein the networking-enabled device is a networking-enabled refrigerator and the at least one item is at last one perishable food item.

4. The system of claim 3, wherein the networking-enabled refrigerator includes a detector and the at least one item bears an indicator perceptible by the at least one detector, the networking-enabled refrigerator including a control device programmed to generate the notifications by reporting the presence of the indicator within the refrigerator.

5. The system of claim 4, wherein the at least one detector comprises at least one of an infrared detector and the at least one indicator is an infrared watermark and a radio frequency identification (RFID) detector and the indicator is an RFID tag.

6. The system of claim 1, wherein the consumption system in determining the quantity per use by the appliance is further configured to average multiple determined quantities per use determined from a respective one of multiple cycles between corresponding purchases of the at least one item.

7. The system of claim 6, wherein the profile system in applying the second set of rules is configured to determine a consumption rate as a function of a number of notifications of usage of the at least one item received over a tracked period of time, and the quantity per use of the at least one item per notification.

8. The system of claim 7, wherein the profile system in applying the second set of rules is configured to determine the runout date as a function of the tracked supply of the at least one item purchased by the customer relative to the consumption rate.

9. The system of claim 1, wherein the ordering system, in implementing executable code applying the third set of rules is further configured to cause one or more processing devices to:

transmit a notification to the user;
receive acceptance of the automatic ordering; and
cause the invoking of the automatic ordering of the at least one item in response to receiving the acceptance of the automatic ordering.

10. The system of claim 1, wherein the ordering system is configured to track movement of the user computing device associated with the user, select a delivery location based on the tracked movement of the user computing device, and notify the user of the selected delivery location.

11. The system of claim 1, wherein the received notifications from the networking-enabled device are received periodically and each comprises for each of multiple different instances stored by the network-enabled device and over a notification period of time a direction indication specifying whether the at least one item is removed from or inserted into the network-enabled device, a time of the removal or insertion, and the identifier of the at last one item.

12. A method of tracking retail customer consumption of retail items and automating ordering comprising:

by a server system:
tracking purchases of at least one item purchased for a user, and for each purchase updating a supply of a corresponding one of the at least one item available for use at the user's residence by a home appliance;

receiving notifications from a networking-enabled device operating at the user's residence, the networking-enabled device being the appliance used in combination with the at least one item and each of the notifications comprising a notification of use of one of the at least one item;

receiving, from a user computing device associated with the user, (I) a unique item identifier for each of the at least one item captured by the user using the user computing device in scanning the at least one item to capture the unique item identifier, and (II) a corresponding subscription notification of a request from the user to subscribe to start a process of having consumption of the at least one item tracked over time and authorize automatically making subsequent purchases of the at least one item on behalf of the customer; and initiating, in response to receiving the unique item identifier and the subscription notification of the request to start the tracking the consumption of the at least one item, an automatic over time of the consumption of the at least one item based on the unique item identifier;

obtaining a first set of rules that when applied determine item consumption by the appliance as a function of usage per instance;

applying the first set of rules and determining consumption of the at least one item based on the notifications;

wherein the applying the first set of rules comprises determining a quantity per use by the appliance based on tracking over time a number of uses between at least one cycle of a purchase of the at least one item and a subsequent purchase of the same item, wherein the number of uses is based on the received notifications from the network-enabled device;

obtaining a second set of rules that when applied determine a runout date for the at least one item as a function of the consumption of the at least one item;

applying the second set of rule and determining a runout date for the at least one item according to the consumption of the at least one item;

causing a listing of a plurality of items, comprising the at least one item, being tracked to be displayed to the user, receiving a selection from the listing of a first item, and in response to the selection from the user regarding the first item, distributing a graphical user interface to be displayed on the user computing device pictorially illustrating a consumed and remaining amount of the first item and a first item identifier of the first item and a scheduled shipment date;

obtaining a third set of rules that when applied invoke automatic ordering of the at least one item as a function of the runout date;

and applying the third set of rules and invoking automatic ordering of the at least one item causing delivery of the at least one item at least by the runout date.

13. The method of claim 11, wherein the networking-enabled device is a networking-enabled coffee making device and the at least one item is a package of coffee;

wherein each notification of the notifications, as determined based on the first set of rules, indicates at least one of that the coffee making device has produced a cup of coffee and has been instructed to make a cup of coffee; and applying at least the first set of rules and determining consumption of the at least one item from the notifications by incrementing an amount of coffee consumed in response to each notification, the amount corresponding to a configuration of the coffee making device.

14. The method of claim 12, wherein the networking-enabled device is a networking-enabled refrigerator and the at least one item is at least one perishable food item.

15. The method of claim 14, wherein the networking-enabled refrigerator includes a detector and the at least one item bears an indicator perceptible by the at least one detector, the networking-enabled refrigerator including a control device programmed to generate the notifications by reporting the presence of the indicator within the refrigerator.

16. The method of claim 15, wherein the at least one detector comprises at least one of an infrared detector and the at least one indicator is an infrared watermark and a radio frequency identification (RFID) detector and the indicator is an RFID tag.

17. The method of claim 12, wherein the determining the quantity per use by the appliance comprises averaging multiple determined quantities per use determined from a respective one of multiple cycles between corresponding purchases of the at least one item.

18. The method of claim 17, wherein the applying the second set of rules comprises determining a consumption rate as a function of a number of notifications of usage of the at least one item received over a tracked period of time, and the quantity per use of the at least one item per notification.

19. The method of claim 18, wherein the applying the second set of rules comprises determining the runout date as a function of the tracked supply of the at least one item purchased by the customer relative to the consumption rate.

20. The method of claim 12, wherein the invoking the automatic ordering of the at least one item comprises:

transmitting, by the server system, a notification to the user;

receiving, by the server system, acceptance of the automatic ordering; and invoking, by the server system, the automatic ordering of the at least one item in response to receiving the acceptance of the automatic ordering.

\* \* \* \* \*

UNITED STATES PATENT AND TRADEMARK OFFICE
CERTIFICATE OF CORRECTION

PATENT NO. : 10,796,274 B2
APPLICATION NO. : 15/410347
DATED : October 6, 2020
INVENTOR(S) : Sai Phaneendra Sri Harsha Viswanath Putch et al.

It is certified that error appears in the above-identified patent and that said Letters Patent is hereby corrected as shown below:

In the Claims

At Column 11, Line 46, Claim 3, delete "last" and insert --least-- after "is at".

At Column 12, Line 29, Claim 11, delete "last" and insert --least-- after "the at".

At Column 13, Line 25, Claim 13, delete "claim 11" and insert --claim 12-- after "method of".

Signed and Sealed this
Second Day of March, 2021

Drew Hirshfeld
*Performing the Functions and Duties of the
Under Secretary of Commerce for Intellectual Property and
Director of the United States Patent and Trademark Office*